United States Patent
Parthasarathy et al.

(10) Patent No.: US 12,229,284 B2
(45) Date of Patent: Feb. 18, 2025

(54) MULTIUSER UNIFIED ENDPOINT MANAGEMENT

(71) Applicant: Omnissa, LLC, Mountain View, CA (US)

(72) Inventors: Senthil Parthasarathy, Atlanta, GA (US); Kevin B. Sheehan, Bloomfield, CT (US); Muhammad Anadil Furqan, Austin, TX (US); Haroon Barlas, Manor, TX (US); Amruta Moghe, Bangalore (IN); Kishore Krishnakumar, Atlanta, GA (US); Adarsh Subhash Chandra Jain, Atlanta, GA (US)

(73) Assignee: Omnissa, LLC, Mountain View, CA (US)

( * ) Notice: Subject to any disclaimer, the term of this patent is extended or adjusted under 35 U.S.C. 154(b) by 162 days.

(21) Appl. No.: 17/989,668

(22) Filed: Nov. 17, 2022

(65) Prior Publication Data
US 2024/0169078 A1   May 23, 2024

(51) Int. Cl.
G06F 21/00 (2013.01)
G06F 21/60 (2013.01)
H04L 9/06 (2006.01)

(52) U.S. Cl.
CPC .......... G06F 21/606 (2013.01); H04L 9/0643 (2013.01)

(58) Field of Classification Search
CPC .............................. H04L 9/0643; G06F 21/606
USPC ............................................................. 726/5
See application file for complete search history.

(56) References Cited

U.S. PATENT DOCUMENTS

| | | | |
|---|---|---|---|
| 9,972,004 B1* | 5/2018 | Donavalli | G06Q 20/20 |
| 10,740,739 B2* | 8/2020 | Kulasooriya | G06Q 30/0223 |
| 2016/0006742 A1* | 1/2016 | Oka | H04L 63/102 |
| | | | 726/4 |
| 2016/0092950 A1* | 3/2016 | Driscoll | G06Q 30/0609 |
| | | | 705/26.8 |
| 2023/0185929 A1* | 6/2023 | Halstead | G06F 21/31 |
| | | | 713/168 |

* cited by examiner

Primary Examiner — Josnel Jeudy
(74) Attorney, Agent, or Firm — Kim & Stewart LLP

(57) ABSTRACT

Disclosed are various embodiments of a multiuser unified endpoint management (UEM) system. A device check-in can be received from a client device. The device check-in can include a device identifier that uniquely identifies the client device with respect to other client devices and a user identifier that uniquely identifies the user of the client device with respect to other users of the client device. In response, a device channel identifier associated with the device identifier and a user channel identifier associated with both the user identifier and the device identifier can be obtained. Then a first set of entitlements associated with the device channel identifier and a second set of entitlements associated with the user channel identifier can be selected. Both sets of entitlements can be provided to the client device in response to the device check-in.

20 Claims, 4 Drawing Sheets

MULTIUSER UNIFIED ENDPOINT MANAGEMENT

BACKGROUND

Unified Endpoint Management (UEM) services allow for organizations or enterprises to configure and manage client devices operated by their employees or end-users. For example, UEM services can allow for organizations to control which applications are installed on a client device, which networks the user is permitted to connect to, which files a user is permitted to access, etc. UEM services also allow for an organization or enterprise to force client devices back into compliance with predefined rules or policies. For example, if a user installed an unauthorized application, or connected to an unauthorized network, the UEM services could detect the drift from the authorized state and force the client device back into a compliant state by uninstalling the unauthorized application or removing the unauthorized network from the list of available networks.

To connect with laptops, smartphones, tablets, desktops, and other client devices, many UEM services utilize the Open Mobile Alliance Device Management (OMA DM) protocol. This protocol allows the UEM to receive state data from and communicate instructions to the client devices 106. However, the OMA DM protocol does not support per user configuration state management. For smartphones and tablets, only a single user is permitted. Likewise, while many laptop and desktop operating systems support multiple users on the same machine, often only a single user operates the laptop or desktop.

However, a number of laptops and desktops are deployed in situations where multiple users regularly logon or logoff of the same client device. Moreover, different users may have different permissions or requirements to access different applications or computing resources. In these situations, a UEM service that utilizes the OMA DM protocol may be unable to easily or accurately provide per user configuration or management of a registered device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for providing unified endpoint management (UEM) services to multiuser devices. Multiple channels can be created to support managed client devices, including device specific channels and user specific channels. A device specific channel can represent the desired or specified state of a client device, while a user specific channel can represent user specific configuration settings. The state of the client device can be represented by the union of the device channel and the user channel for the client device. As a result, multiuser devices can be supported by UEM services.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
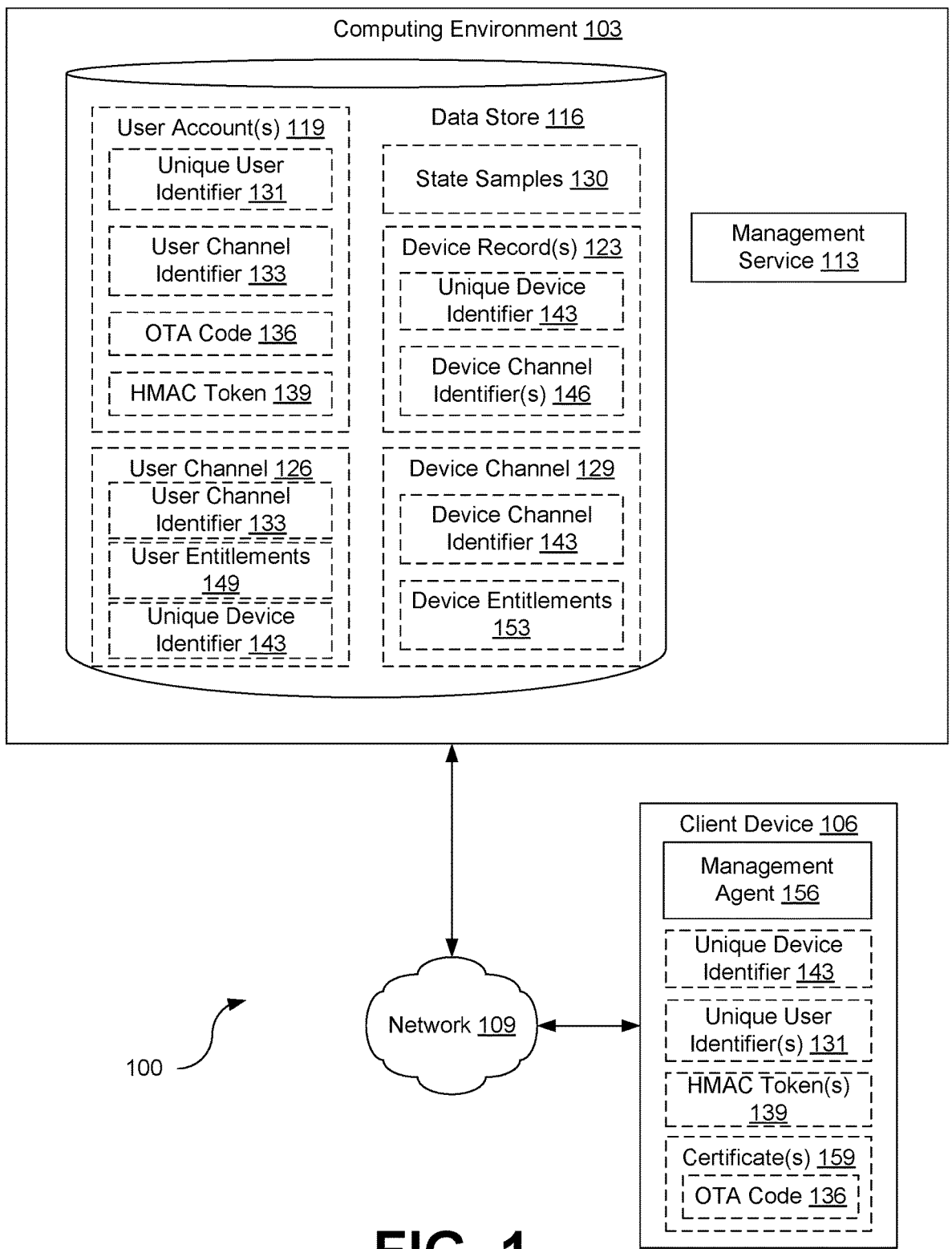
FIG. 1 is a drawing of a network environment according to various embodiments of the present disclosure.

FIG. 1 show a network environment 100 according to various embodiments. The network environment 100 can include a computing environment 103 and at least one client device 106. The computing environment 103 and the client device 106 can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a management service 113, and other applications, services, processes, systems, engines, or functionality not discussed in detail herein.

Also, various data is stored in a data store 116 that is accessible to the computing environment 103. The data store 116 can be representative of a plurality of data stores 116, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 116 is associated with the operation of the various applications or functional entities described below. This data can include one or more user accounts 119, one or more device records 123, one or more user channels 126, one or more device channels 129, one or more state samples 130, and potentially other data.

The user accounts 119 can represent individual users of a client device 106. Each user of the client device 106 can have his or her own user account 119, and each client device 106 can permit multiple users to login and use the client device 106. In some instances, the client device 106 could provide for different users to login and use the client device 106 at different times. However, the operating system (e.g., MICROSOFT WINDOWS®, APPLE MACOS®, and various distributions of LINUX®) may be configured to permit multiple users to login and use the client device 106 simultaneously (e.g., one or more users logging in remotely via the network 109 to use the same client device 106). Moreover, individual users may use the same user account 119 to login to and use different client devices 106. For example, client devices 106 in a call center, hospital, retail storefront, etc., may be configured to allow different users to login to the same client device 106 so that different users can use the same client device 106 during different shifts. As another example, users may use their user account 119 to login to different client devices 106, such as if they use different client devices 106 over the course of their shift.

Accordingly, different types of data can be stored for each user account 119. A user account 119 could include one or more unique user identifiers 131, one or more user channel identifiers 133, a one-time access code 136, a hash-based message authentication code (HMAC) token 139, and potentially other information. The unique user identifier 131 can represent any identifier that uniquely identifies a user account 119 with respect to another user account 119. Examples can include usernames, user principal names (UPNs) in MICROSOFT ACTIVE DIRECTORY environments, hashed usernames, hashed UPNs, email addresses, hashed email addresses, etc. Each user channel identifier 133 stored in the user account 119 can be used to identify a user channel 126 applicable to the user account 119. The one-time access code 136 can represent any single use authentication credential that can be used to authenticate a user with the management service 113. The HMAC token 139 can represent a multi-use authentication credential that can be used to authenticate a user with the management service 113.

The device records 123 can represent individual client devices 106 registered with or managed by the management service 113. Each device record 123 can include a unique device identifier 143 and at least one device channel identifier 146 applicable to the client device 106. Other information can also be stored in the device record 123 as applicable to various embodiments of the present disclosure.

The user channel 126 represents the context of a user currently logged into the client device 106. Each user logged into the client device 106 can, therefore, be associated with a different user channel 126. Accordingly, a user channel 126 can include a user channel identifier 133 that uniquely identifies a user channel 126 with respect to other user channels 126. Because the same user could be logged in on multiple client devices 106 simultaneously, in some implementations each user channel 126 can also include the unique device identifier 143 that the user is currently logged into.

A user channel 126 can also specify one or more user entitlements 149. Each user entitlement 149 can represent one or more resources that a user of a client device 106 is entitled to access or is prohibited from accessing. For example, user entitlements 149 could be used to specify that a user is permitted to access or use a particular application installed on the client device 106, is permitted to read, write, or edit specified files, folders, or drives, is permitted to access specified hardware of the client device 106 (e.g., web cameras, microphones, etc.), is permitted to use specified operating system functions (e.g., copy-and-paste), is permitted to modify the configuration of the client device 106 in a specified manner (e.g., adding printers, external drives, etc.), is permitted to access particular network resources (e.g., connect to specified wireless networks, use specified virtual private network (VPN) clients or resources, etc.), etc. Likewise, user entitlements 149 could be used to restrict, limit, or prohibit a user's access to particular applications installed on the client device 106, to specified files, folders, or drives, to specified hardware (e.g., prohibiting access to web cameras, microphones, etc.), to specified operating system functions (e.g., copy-and-paste), to modify the configuration of the client device 106, to access particular network resources (e.g., connect to specified wireless networks, use specified virtual private network (VPN) clients or resources, etc.), etc.

The device channel 129 represents the context or current context of the client device 106 enrolled with the management service 113. The device channel 129 can also specify one or more device entitlements 153 for the client device 106. Each device entitlement 153 can represent one or more resources that should be enabled or disabled for all users of the client device 106. For example, a device entitlement 153 could specify that a particular application should be installed on the client device 106, that particular configuration settings should be enable or disabled on the client device 106, etc.

In some instances, there may be conflicts between user entitlements 149 and device entitlements 153. In these instances, the management service 113 could resolve the conflict using one or more predefined conflict resolution rules. For example, the management service 113 could follow a previously specified rule to enforce a user entitlement 149 whenever there is a conflict with a device entitlement 153 because the user entitlement 149 is narrower in scope. However, the opposite conflict resolution could be defined by an operator or administrator of the management service 113.

In addition, a single client device 106 could have multiple device channels 129 associated with it in some implementations of the present disclosure. For example, a client device 106 could have a first device channel 129 for when the client device 106 is on the premises of the user's employer, and a second device channel 129 for when the client device 106 is located off the premises. This allows for different device entitlements 153 to be applied to the client device 106 based on the location of the client device 106. Additional device channels 129 could be assigned to a client device 106 based on other situations.

In some implementations, a single device channel 129 could be shared by multiple client devices 106. For example, an enterprise could create a single device channel 129 for all WINDOWS laptops enrolled with the management service 113 in order to enforce a common setup across devices. As another example, an enterprise could create a first device channel 129 for client devices 106, such as laptops, located on the premises of the enterprise and a second device channel 129 for when the client devices 106 are located off the premises.

Each state sample 130 can represent a snapshot of the current state of a client device 106 at a particular point in time. A state sample 130 could include information such as the applications installed on the client device 106, the user(s) currently logged into the client device 106, permissions for accessing individual applications, current configuration settings for applications, permissions for accessing files, drives, networks, or other resources, etc.

Although tracked and stored separately, the union of a user channel 126 and a device channel 129 can be used to identify the complete state of a user on a client device 106. Accordingly, the union of separate user channels 126 with the same device channel 129 could be used to track the complete state of different users on the same client device 106 so that user specific configurations could be applied to and enforced on a client device 106. Each state sample 130 could, therefore, be uniquely identified by the union of an appropriate user channel 126 and a device channel 129 with another identifier (e.g., a time stamp).

The management service 113 can operate as a UEM platform that can manage client devices 106 that are enrolled as managed devices with the management service 113. Accordingly, the management service 113 can identify client devices 106 enrolled with the management service 113 and provide commands to the client devices 106 to perform various actions. Although the management service 113 is described herein as performing a variety of operations, it is understood that one or more of these operations could be performed by separate applications or services. For example, separate services might be responsible for authenticating users, identifying user channel identifiers 133 or device channel identifiers 143 based on unique user identifiers 131 or unique device identifiers 131, identifying or selecting appropriate user entitlements 149 and/or device entitlements 149, etc. In these implementations, the collection of separate applications or services working together in concert can be considered to operate as the management service 113 for the purposes of the present disclosure.

The client device 106 is representative of a plurality of client devices that can be coupled to the network 109. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as a management agent 156 or other applications. The client device 106 can be configured to execute applications beyond the management agent 156, such as email applications, social networking applications, word processors, spreadsheets, or other applications. Also, various data can be stored on the client device 106, such as the unique device identifier 143 for the client device 106 and the unique user identifier(s) 131 for any users currently logged into the client device 106.

The management agent 156 can be executed to register or enroll the client device 106 with the management service 1113 and to implement or enforce compliance with various commands or instructions provided by the management service 113. For example, the management agent 156 can be configured to regularly contact the management service 113 to provide status updates on the operation, state, or configuration of the client device 106 and retrieve commands from the management service 113 to implement on the client device 106.

Although the management agent 156 is described herein as performing a variety of operations, it is understood that one or more of these operations could be performed by separate applications or services. For example, separate services might be responsible for authenticating users, identifying and/or reporting the current state of the client device 106, identifying deviations or drifts in the current state of the client device 106 from a desired state specified by one or more user entitlements or device entitlements, and correcting any deviations. In these implementations, the collection of separate applications or services working together in concert can be considered to operate as the management agent 156 for the purposes of the present disclosure.

The client device 106 can also be configured to store various data used in the various embodiments of the present disclosure. For example, the client device 106 could store a copy of the unique device identifier 143 assigned to the client device 106, the unique user identifiers 131 assigned to the users who have logged into the client device 106, HMAC token(s) 139 assigned to the users who have logged into the client device 106, as well as one or more certificates 159 issued to the users who have logged into the client device 106. Individual certificates 159 can have an OTA code 136 included for authentication with the management service 113, as discussed later in the present disclosure.

Next, a general description of the operation of the various components of the network environment 100 is provided. Although the following description illustrates how the different components of the network environment 100 interact with each other, the following description is not the only manner in which the different components of the network environment 100 may interact with each other. Additional details regarding the operations of specific components is provided in the discussion accompanying FIGS. 2-4.

To begin, a client device 106 is enrolled with the management service 113 in order to be managed by an enterprise. As part of the enrollment process, the management service 113 can cause the management agent 156 to be installed on the client device 106. The management 156 can then provide the unique device identifier 131 for the client device 106 to the management service 113, as well as the unique user identifier 131 of any users currently logged into the client device 106. As each additional user logs into the client device 106, the management agent 156 can determine the unique user identifier 131 for those additional users.

Periodically, the management agent 156 can report to or otherwise check-in with the management service 113. As part of the check-in process, the management agent 156 can provide both the unique device identifier 131 of the client device 106 and the unique user identifier 131 of the user currently logged into the client device 106. If multiple users are concurrently logged into the client device 106, the management agent 156 can provide a first union of the unique device identifier and a first unique user identifier 131 for the first user, and a second union of the unique device identifier and a second unique user identifier 131 for the second user. If no users are currently logged into the client device 106, the management agent 156 could report just the unique device identifier 131 of the client device 106.

In response to the management agent 156 checking-in, the management service 113 can identify a user channel 126 and a device channel 129 that match the unique user identifier 131 and the unique device identifier 131 received from the management agent 156. The management service 113 can the select the appropriate user entitlements 149 and device entitlements 153 and provide them to the management agent 156 in response.

Upon receipt of the entitlements, the management agent 156 can evaluate the current state or configuration of the client device 106 for compliance with the entitlements received from the management service 113. For each mismatch between the current state of the client device 106 and an entitlement, the management agent 156 can perform a remedial action to bring the client device 106 into compliance with the entitlement. For example, if a device entitlement 153 specified that a particular application be installed on the client device 106 and/or be configured in a particular manner, the management agent 156 could determine whether the client device 106 has the application installed and/or configured in the specified manner. If the application is not installed and/or configured as specified, the management agent 156 could perform one or more remedial actions, such as executing an installer for the application and/or configuring the application in the specified manner (e.g., but editing a configuration file for the application). As similar example, if a user entitlement 149 specified that the user currently logged into the client device 106 were permitted to use a specific application, but the application was not installed, then the management agent 156 could execute the installer for the application to cause it to be installed on the client device 106 and then set permissions for the application so that only the specified user could have access to or otherwise execute the application.

Figure 2:
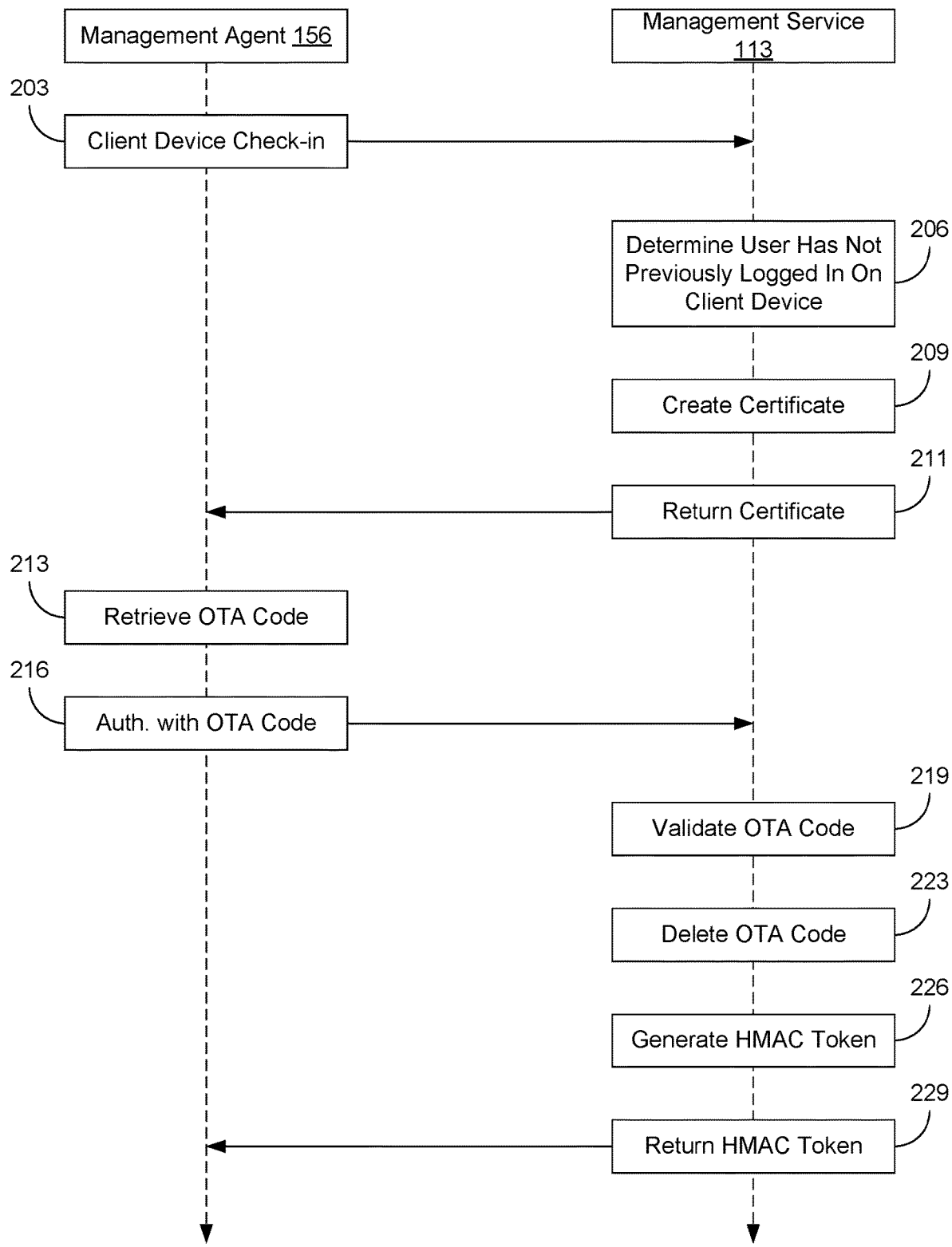
FIGS. 2-4 are sequence diagrams illustrating the interactions between the various components of the network environment of FIG. 1 according to various embodiments of the present disclosure.

Referring next to FIG. 2, shown is a sequence diagram that provides an example of one of the series of interactions between the management service 113 and the management agent 156. The sequence diagram of FIG. 2 provides merely an example of the many different types of functional arrangements that can be employed by the management service 113 and the management agent 156. As an alternative, the sequence diagram of FIG. 2 can be viewed as depicting an example of elements of a method implemented within the network environment 100.

Beginning with block 203, the management agent 156 of the client device 106 can perform a check-in with the management service 113. This could be done, for example, in response to a user logging into the client device 106 in order to ensure that the appropriate configurations and permissions are applied to the user. The check-in message can include information such as the unique user identifier 131 of the user, and potentially other information.

Then, at block 206, the management service 113 can determine that the user has not previously logged into the client device 106. For example, if the check-in message sent at block 203 failed to contain either an OTA code 136 or an HMAC token 139, then the management service 113 could determine that the user has not previously logged into the client device 106. As another example, the management service 113 could track which users the management agent 156 has previously reported as being logged into the client device 106 during a check-in. If a user is not included in such a list or record, the management service 113 could determine that the user has not previously logged into the client device 106.

In response to a determination at block 206 that the user has not previously logged into the client device 106, the management service 113 can cause a certificate 159 to be created for the user of the client device 106 at block 209. The certificate 159 could be issued by a certificate authority or using the simple certificate enrollment protocol (SCEP). As part of the certificate creation process, the management service 113 can generate an OTA code 136 for the user. The OTA code 136 can be inserted into the certificate 159 and can also be saved to the user account 119 associated with the unique user identifier 131.

Then, at block 211, the management service 113 can return the certificate 159 to the management agent 156. For example, the management service 113 could issue a SCEP command to delete any existing certificate 159 issued by the management service 113 as well as a SCEP command to atomically add the certificate 159 to the certificate store associated with the user of the client device 106.

The management agent 156 can store the certificate 159 in the certificate store and then, at block 213, the management agent 256 can retrieve the OTA code 136 from the certificate 159. Next, at block 216, the management agent 156 can authenticate the user with the OTA code 136. The authentication request could include both the OTA code 136 and the unique user identifier 131 of the user logged onto the client device 106.

Proceeding to block 219, the management service 113 can validate the OTA code 136. For example, the management service 113 could determine whether the OTA code 136 supplied by the management agent 156 matches the OTA code be saved to the user account 119 associated with the unique user identifier 131 of the user logged onto the client device 106.

If the OTA code 136 provided by the management agent 156 matches the OTA code 136 stored in the user account 119 of the user, then the management service 113 can, at block 223, delete or remove the OTA code 136 from the user account 119 record stored in the data store 116. This can be done to prevent future reuse of the OTA code 136 by the user or by malicious third-parties.

Subsequently, at block 226, the management service 113 can generate an HMAC token 139 to be issued to the user. The created HMAC token 139 can be saved to the user account 119 of the user identified by the by the unique user identifier 131. Once saved, the management service 113 can then provide the HMAC token 139 to the management agent 156, which can store it for subsequent authentications on behalf of the user.

Figure 3:
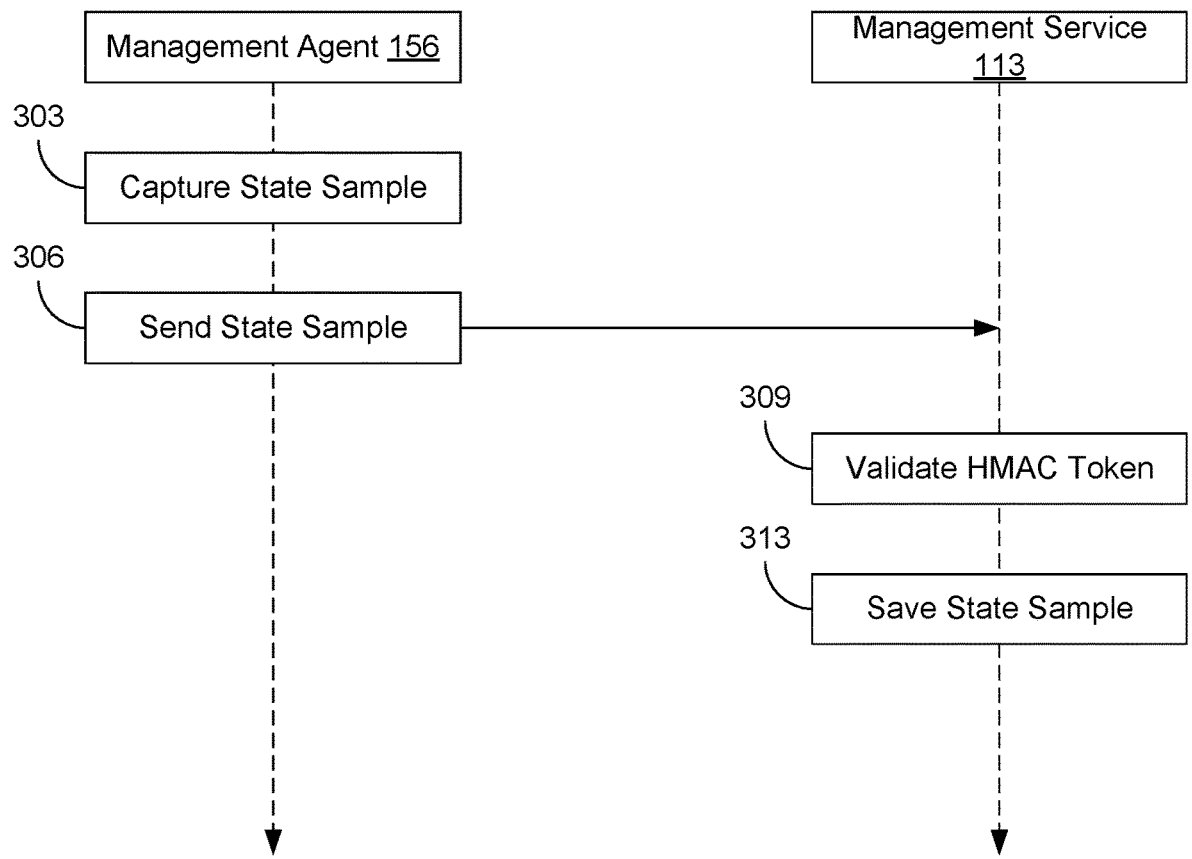

Referring next to FIG. 3, shown is a sequence diagram that provides an example of one of the series of interactions between the management service 113 and the management agent 156. The sequence diagram of FIG. 3 provides merely an example of the many different types of functional arrangements that can be employed by the management service 113 and the management agent 156. As an alternative, the sequence diagram of FIG. 3 can be viewed as depicting an example of elements of a method implemented within the network environment 100.

Beginning with block 303, the management agent 156 can capture a state sample 130 of the client device 106, which represents the current state of the client device 106 For example, the management agent 156 could capture a snapshot of all the currently installed applications on the client device 106, which user(s) are currently logged into the client device 106, which users have permission to access particular applications installed on the client device 106, which resources (e.g., networks, files, folders, drives, hardware peripherals, etc.) are enabled or disabled for the client device 106, which users have permission to access particular resources, etc.

Then, at block 306, the management agent 156 can send the state sample 130 to the management service 113. The state sample could be sent using a variety of protocols, such as the Open Mobile Alliance Device Management (OMA DM) protocol. The management agent 156 could also send the unique device identifier 131 of the client device 106 and/or the unique user identifier(s) 131 of the users currently logged onto the client device 106, as well as other information such as an HMAC token 139 associated with the unique user identifier 131 of a user of the client device 106.

In response to receiving the state sample 130, the management service 113 can validate the HMAC token 139 of a user of the client device 106 at block 309. For example, the management service 113 could search for a user account 119 in the data store 116 identified by the unique user identifier 131 sent with the state sample 130. The management service 113 could then determine whether the HMAC token 139 stored with the user account 119 matches the HMAC token 139 provided by the management agent 156. If the two HMAC tokens 139 match, the process can proceed to block 313. However, if the two HMAC tokens 139 fail to match, then the process could end.

In some implementations, only the unique device identifier 131 of the client device 106 might be sent with the state sample. This could occur if the client device 106 were a single user device or if there were no users logged into the client device 106. In these instances, the functionality of block 309 could be skipped and the process could proceed from block 306 directly to block 313.

At block 313, the management service 113 can save the state sample 130. For example, the management service 113 could identify the channel for the state sample 130 from the union of the device channel identifier and/or the user channel identifier that match the respective unique device identifier 131 and the unique user identifier 131. The management service 113 could then save the received state sample 130 to the identified channel for storage alongside any previous state samples 130.

Figure 4:
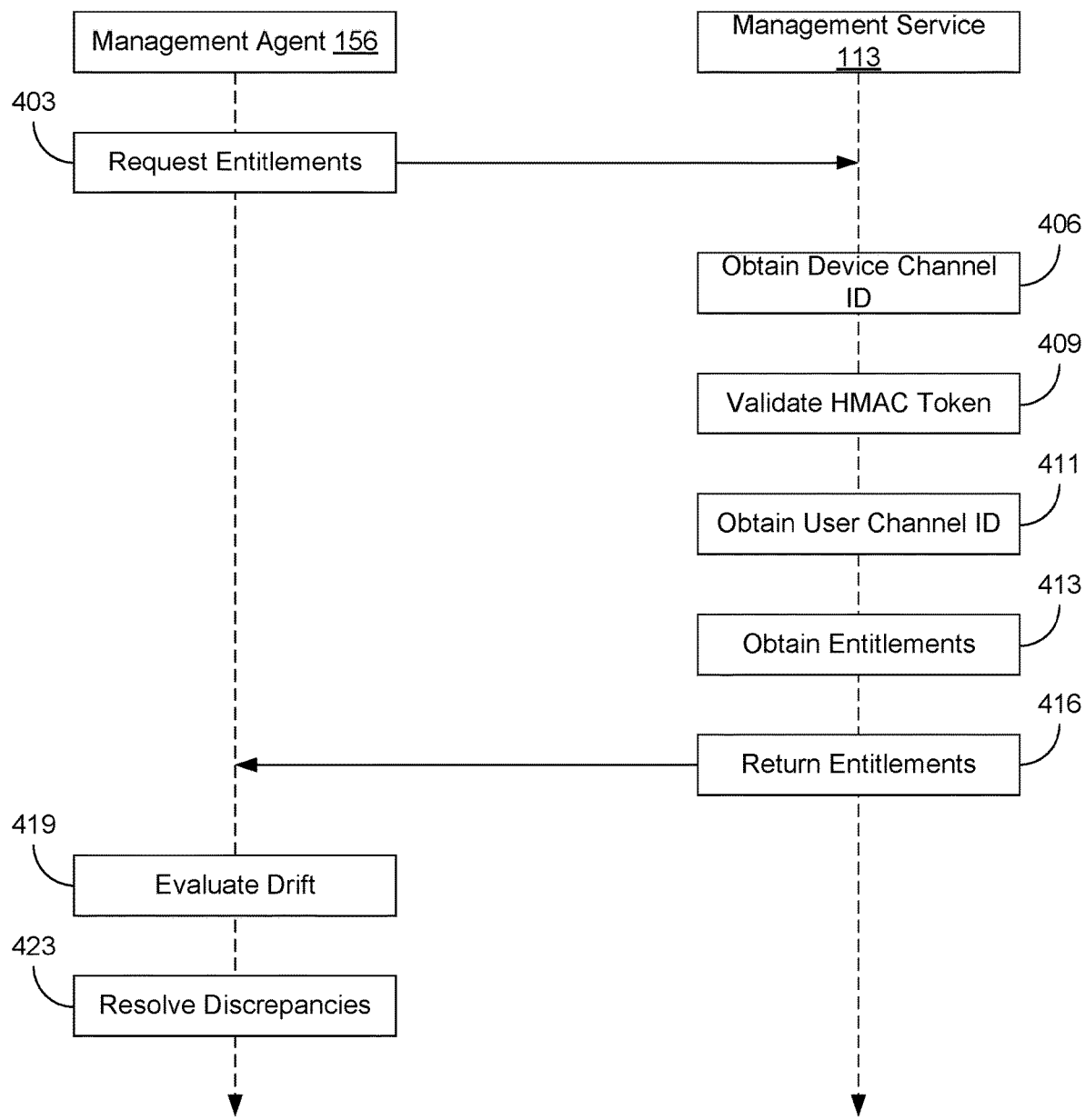

Referring next to FIG. 4, shown is a sequence diagram that provides an example of one of the series of interactions between the management service 113 and the management agent 156. The sequence diagram of FIG. 4 provides merely an example of the many different types of functional arrangements that can be employed by the management service 113 and the management agent 156. As an alternative, the sequence diagram of FIG. 4 can be viewed as depicting an example of elements of a method implemented within the network environment 100.

Beginning with block 403, the management agent 156 can request one or more entitlements (e.g., user entitlements 149 or device entitlements 149) from the management service 113. The request for the entitlements could be performed as part of a regular check-in by the management agent 156 with the management service 113 or in response to specific event (e.g., a user logging into the client device 106 for the first time). The request could include information such as the unique device identifier 131 of the client device 106 and/or the unique user identifier 131 of the user or users currently logged into (or in the process of logging into) the client device 106. If the request includes the unique user identifier 131 of the user, then the management agent 156 could also include an HMAC token 139 that was previously issued to the user by the management service 113.

In response to receiving the request for the entitlements, the management service 113 can, at block 406, obtain the device channel identifier 143 for the device channel 129 associated with the client device 106. For example, the management service 113 can search the data store 116 for a device record 123 with a unique device identifier 131 matching the unique device identifier 131 provided by the management agent 156. The management service 113 could then retrieve the device channel identifier 143 from the device record 123.

If the request for the entitlements includes a unique user identifier 131 of a user, then the management service 113 can validate the HMAC token 139 of the user of the client device 106 at block 409. For example, the management service 113 could search for a user account 119 in the data store 116 identified by the unique user identifier 131 sent with the state sample 130. The management service 113 could then determine whether the HMAC token 139 stored with the user account 119 matches the HMAC token 139 provided by the management agent 156. If the two HMAC tokens 139 match, the process can proceed. However, if the two HMAC tokens 139 fail to match, then the process could end.

If the request for the entitlements includes a unique user identifier 131 of a user, then the management service 113 can also obtain the user channel identifier 133 for the user channel 126 associated with the user of the client device 106 at block 411. For example, the management service 113 can search the data store 116 for a user account 119 with a unique user identifier 131 matching the unique user identifier 131 provided by the management agent 156. The management service 113 could then retrieve the user channel identifier 133 from the user account 119.

Subsequently, the management service 113 could obtain the appropriate entitlements to return to the management agent 156. For example, the management service 113 could search for a device channel 129 matching the device channel identifier 143 and obtain the device entitlements 149 specified in the device channel 129. Similarly, the management service 113 could search for a user channel 126 with a matching user channel identifier 133 and obtain the user entitlements 149 specified in the user channel 126. Then, at block 416, the management service 113 could return the selected entitlements to the management agent 156.

In response to receiving the entitlements from the management service 113, the management agent 156 can, at block 419, evaluate the drift of the state of the client device 106 from the state defined by the entitlements received from the management service 113. For example, for each device entitlement 149 received from the management service 113, the management agent 156 could determine whether the current configuration of the client device 106 is consistent with the device entitlement 149. For example, if a device entitlement 149 specified that a particular application should be installed on the client device 106, the management agent 156 could check to see if it is installed on the client device 106. As another example, if a user entitlement 149 specified that an application should be installed on the client device 106 and made available to a specific user, the management agent 156 could check to see if the application is installed on the client device 106 and if the permissions are configured so that the user could execute the application. In some instances, the management agent 156 could also evaluate whether other users had been given access to the application without a respective user entitlement 149 for the application.

Then, at block 423, the management agent 156 can resolve any discrepancies between the current state of the client device 106 and the state specified by the entitlements. For example, if a user entitlement 149 specifies that a particular application be installed and made available for a user of the client device 106, the management agent 156 could cause the application to be installed and the specified user be granted permission to execute the application if it were not already installed and configured. Similarly, if other users of the client device 106 had permission to execute an application, but no device entitlements 149 or user entitlements 149 specified that the users had been granted permission to execute the application, their permissions could be removed. Likewise, if a device entitlement 149 specifies that an application should be installed on the client device 106, but the application is missing from the client device 106, the management agent 156 could cause the application to be installed on the client device 106. Similarly, if an application were installed on the client device 106, but no device entitlement 149 indicated that the application should be installed, then the management agent 156 could cause the application to be uninstalled from the client device 106.

Although the examples provided regarding the operations of the management agent 156 at block 423 involve the installation or uninstallation of applications, and configuring permissions for who can execute the applications, the management agent 156 can take similar approaches for other types of computer resources. For example, user entitlements 149 or device entitlements 149 could also specify which networks a user or the client device 106 is permitted to connect to, which files or drives the user or the client device is permitted to access, which hardware components of the client device 106 (e.g., microphone, webcam, etc.) should be enable or disabled, which operating system functions (e.g., copy and paste, add external drives, add printers, etc.) should be enabled or disabled, etc. The management agent 156 could adjust permissions or settings so that only networks, files, drives, hardware components, or operating system functions specified in one or more entitlements are made available to the client device 106 or to specific users of the client device 106.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
receive a device check-in from a client device, the device check-in comprising a device identifier that uniquely identifies the client device with respect to other client devices and a user identifier that uniquely identifies the user of the client device with respect to other users of the client device;
obtain a device channel identifier associated with the device identifier;
obtain a user channel identifier associated with both the user identifier and the device identifier;
select a first set of entitlements from a device channel associated with the device channel identifier;
select a second set of entitlements from a user channel associated with the user channel identifier; and
provide the first set of entitlements and the second set of entitlements to the client device in response to the device check-in.

2. The system of claim 1, wherein the machine-readable instructions further cause the computing device to at least:
receive a one-time authentication (OTA) code from the client device, the OTA code being associated with a certificate issued to the user identified by the user identifier;
validate the OTA code;
create a hash-based message authentication code (HMAC) token for the user; and
return the HMAC token to the client device.

3. The system of claim 2, wherein the device check-in is a second device check-in and the machine-readable instructions further cause the computing device to at least:
receive a first device check-in from a client device, the first device check-in comprising the device identifier and the user identifier;
determine that the first device check-in fails to identify an existing union of the device channel identifier and the user channel identifier; and
send a certificate to the client device, the certificate including the one-time access code.

4. The system of claim 2, wherein the machine-readable instructions further cause the computing device to at least:
authenticate the user identified by the user channel identifier based at least in part on the HMAC token, and wherein authentication of the user is based at least in part on the HMAC token.

5. The system of claim 2, wherein the machine-readable instructions further cause the computing device to at least delete the OTA code from a user account associated with the user identifier.

6. The system of claim 1, wherein a state of the client device is represented by the union of the user channel and the device channel.

7. The system of claim 1, wherein a first entitlement within the first set of entitlements from the user channel defines a user specific configuration for the client device and a second entitlement within the second set of entitlements from the device channel defines a device specific configuration for the client device.

8. A method, comprising:
receiving a device check-in from a client device, the device check-in comprising a device identifier that uniquely identifies the client device with respect to other client devices and a user identifier that uniquely identifies the user of the client device with respect to other users of the client device;

obtaining a device channel identifier associated with the device identifier;

obtaining a user channel identifier associated with both the user identifier and the device identifier;

selecting a first set of entitlements from a device channel associated with the device channel identifier;

selecting a second set of entitlements from a user channel associated with the user channel identifier; and providing the first set of entitlements and the second set of entitlements to the client device in response to the device check-in.

9. The method of claim 8, further comprising:

receiving a one-time authentication (OTA) code from the client device, the OTA code being associated with a certificate issued to the user identified by the user identifier;

validating the OTA code;

creating a hash-based message authentication code (HMAC) token for the user; and returning the HMAC token to the client device.

10. The method of claim 9, the device check-in is a second device check-in and the method further comprises:

receiving a first device check-in from a client device, the first device check-in comprising the device identifier and the user identifier;

determining that the first device check-in fails to identify an existing union of the device channel identifier and the user channel identifier; and sending a certificate to the client device, the certificate including the one-time access code.

11. The method of claim 9, further comprising:

authenticating the user identified by the user channel identifier based at least in part on the HMAC token, wherein authentication of the user is based at least in part on the HMAC token.

12. The method of claim 9, further comprising deleting the OTA code from a user account associated with the user identifier.

13. The method of claim 8, wherein a state of the client device is represented by the union of the user channel and the device channel.

14. The method of claim 8, wherein a first entitlement within the first set of entitlements from the user channel defines a user specific configuration for the client device and a second entitlement within the second set of entitlements from the device channel defines a device specific configuration for the client device.

15. A non-transitory, computer-readable medium, comprising machine-readable instructions that, when executed by a processor of a computing device, cause the computing device to at least:

receive a device check-in from a client device, the device check-in comprising a device identifier that uniquely identifies the client device with respect to other client devices and a user identifier that uniquely identifies the user of the client device with respect to other users of the client device;

obtain a device channel identifier associated with the device identifier;

obtain a user channel identifier associated with both the user identifier and the device identifier;

select a first set of entitlements from a device channel associated with the device channel identifier;

select a second set of entitlements from a user channel associated with the user channel identifier; and provide the first set of entitlements and the second set of entitlements to the client device in response to the device check-in.

16. The non-transitory, computer-readable medium of claim 15, wherein the machine-readable instructions further cause the computing device to at least:

receive a one-time authentication (OTA) code from the client device, the OTA code being associated with a certificate issued to the user identified by the user identifier;

validate the OTA code;

delete the OTA code from a user account associated with the user identifier;

create a hash-based message authentication code (HMAC) token for the user; and return the HMAC token to the client device.

17. The non-transitory, computer-readable medium of claim 16, wherein the device check-in is a second device check-in and the machine-readable instructions further cause the computing device to at least:

receive a first device check-in from a client device, the first device check-in comprising the device identifier and the user identifier;

determine that the first device check-in fails to identify an existing union of the device channel identifier and the user channel identifier; and send a certificate to the client device, the certificate including the one-time access code.

18. The non-transitory, computer-readable medium of claim 16, wherein the machine-readable instructions further cause the computing device to at least:

authenticate the user identified by the user channel identifier based at least in part on the HMAC token, and wherein authentication of the user is based at least in part on the HMAC token.

19. The non-transitory, computer-readable medium of claim 16, wherein the machine-readable instructions further cause the computing device to at least delete the OTA code from a user account associated with the user identifier.

20. The non-transitory, computer-readable medium of claim 15, wherein a state of the client device is represented by the union of the user channel and the device channel.

* * * * *